Figure 3:
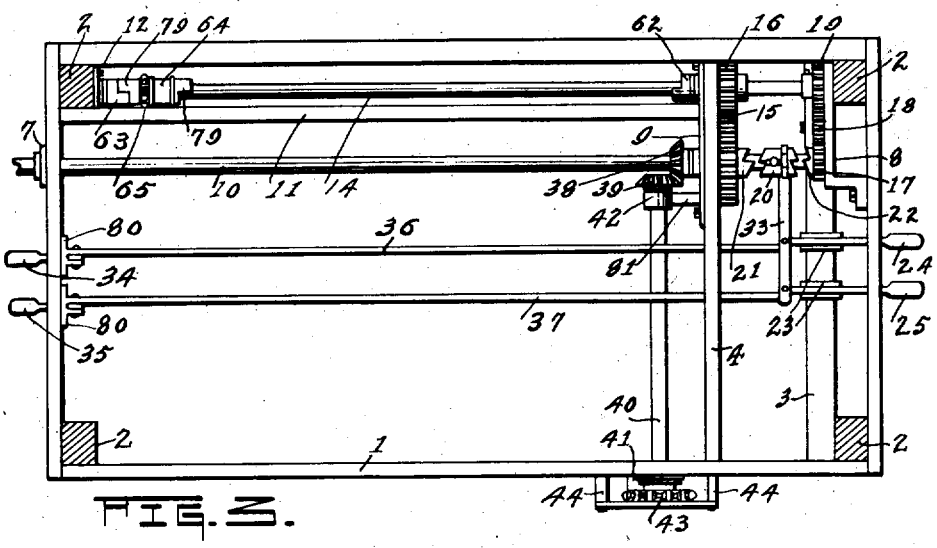

J. ROCKE.
GEARING.
APPLICATION FILED JAN. 5, 1914.
Reissued May 30, 1916.
14,144.
2 SHEETS—SHEET 1.
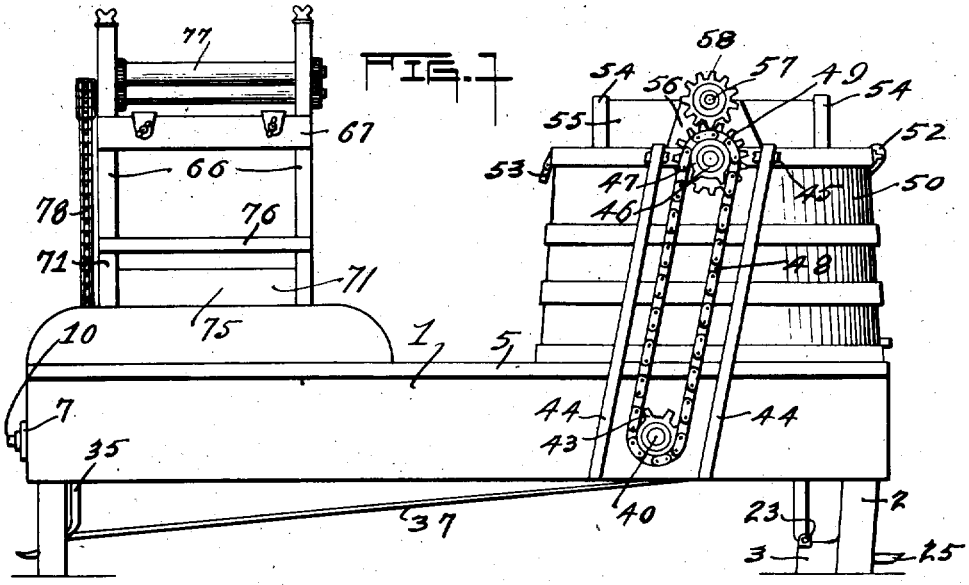
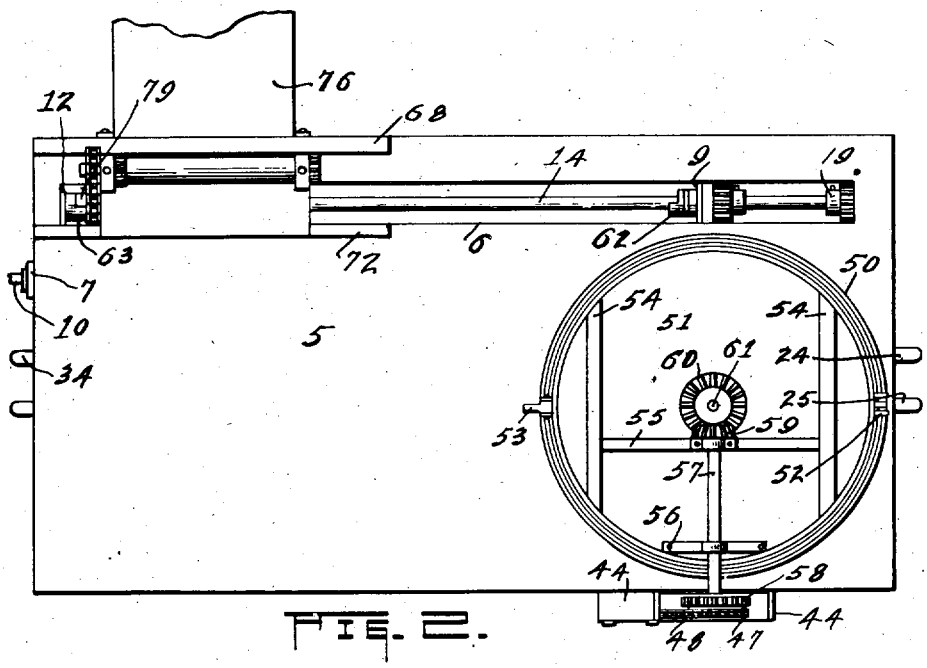
FIG. 2.
Witnesses:—
Mary E. Conaggl
H. V. Gibson
Inventor
John Rocke
By Wm. V. Dyft Atty.

J. ROCKE.

GEARING.

APPLICATION FILED JAN. 5, 1914.

Reissued May 30, 1916.

14,144.

2 SHEETS—SHEET 2.

Witnesses:-
Mary E. Comegys.
H. V. Gibson

Inventor
John Rocke
By Wm. V. Tefft Atty.

UNITED STATES PATENT OFFICE.

JOHN ROCKE, OF PONTIAC, ILLINOIS.

GEARING.

14,144. Specification of Reissued Letters Patent. Reissued May 30, 1916.

Original No. 1,041,352, dated October 15, 1912, Serial No. 541,693. Application for reissue filed January 5, 1914. Serial No. 810,517.

*To all whom it may concern:*

Be it known that I, JOHN ROCKE, a citizen of the United States, residing at Pontiac, in the county of Livingston and State of Illinois, have invented a new and useful Gearing, of which the following is a specification.

It is the object of this invention to provide a combined washing machine and movable wringer operable from a single drive shaft wherein the wringer may be operated in a forward or reverse direction or held in-operative while the washing machine is in operation or at rest.

Another object of the invention is to provide a housing upon which washing appliances may be placed together with a movable frame, upon which a wringer may be placed, and to locate the driving machinery as much as possible in a protected position.

Another object of the invention is to provide a device equipped with a movable wringer-frame, wherein the wringer may be reversed or rendered in-operative in any of its adjusted positions.

Another object of the invention is to provide a device with a movable wringer adapted to be operated in any of its positions of movement, with pedals adjacent the wringer in any of its positions for controlling the operation of the wringer.

Another object of the invention is to provide a mechanism for operating a washing machine, and to provide an auxiliary mechanism adapted to be connected operatively, at the will of the operator, with the mechanism for operating the washing machine, the mechanism thus connected with the operating mechanism of the washing machine being arranged to operate a wringer in a forward or reverse direction, as desired.

With the above and other objects in view, the invention consists in the novel construction and arrangement of parts hereinafter described, delineated in the drawings, and claimed, it being understood that changes, properly falling within the scope of what is claimed, may be made, without departing from the spirit of the invention.

Similar numerals of the reference are employed to denote corresponding parts throughout the several figures of the drawings.

Figure 4:
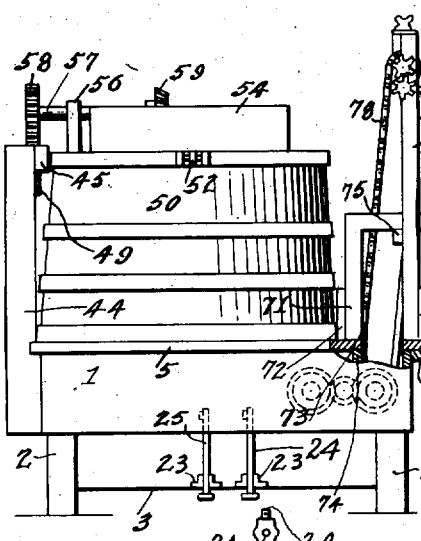
Figure 5:
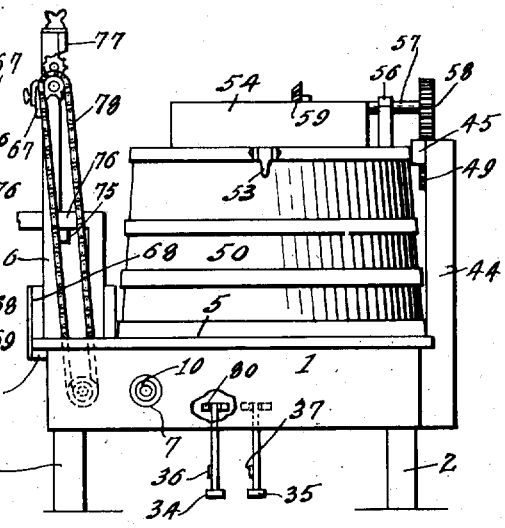
Figure 6:
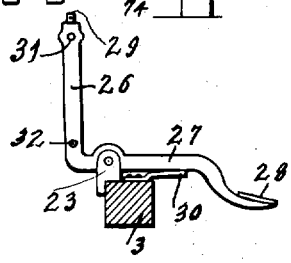

In the accompanying drawings,—Figure 1 is a side elevation; Fig. 2 is a top plan; Fig. 3 is a top plan of the housing; parts being removed to reveal the internal construction of the device; Fig. 4 is an elevation of one end of the device; Fig. 5 is an elevation of the opposite end of the device; Fig. 6 is a side elevation of one of the pedals whereby the wringer is reversed.

The housing or main frame upon which my invention is mounted, consists of a rectangular frame 1, having legs 2 at its corners. The sides of the frame 1 are connected by a transverse sill 4, and one pair of the legs 2 are connected by a sill 3, there being a longitudinally extended sill 11 connecting the sill 4 with one end of the frame 1. Mounted upon the frame 1 and extended slightly beyond the same, is a flat top 5, which, adjacent one of the longer edges of the frame, is slotted as shown at 6.

At one end of the frame 1 there is a bearing 7, and at the opposite end of the frame and located within the contour of the same, there is a bracket bearing 8, a bearing 9 being mounted upon the sill 4. Journaled for rotation in these bearings 7, 8, and 9, and protruding through the bearing 7 beyond the end of the frame 1, is a drive shaft 10, it being understood that any suitable means for operating the drive shaft, may be connected with that portion thereof which outstands the bearing of 7.

To one of the corner posts 2, a bearing 12 is secured, and in this bearing, and in the bearings 9 and 8, there is journaled for rotation an auxiliary shaft 14, disposed substantially parallel to the drive shaft 10, and located beneath the slot 6 in the top 5 of the housing.

A pinion 15 is loose upon the shaft 10, and this pinion is in mesh with a pinion 16 which is fixed upon the auxiliary shaft. These pinions 15 and 16 are located adjacent the cross sill 4. Adjacent the bracket bearing 8, a pinion 17 is mounted for free rotation upon the drive shaft 10. This pinion 17 is in mesh with an intermediate pinion 18 which is secured for rotation to the bracket bearing 8, the intermediate pinion 18 being in mesh with a pinion 19, secured to the auxiliary shaft 14.

A clutch 20 is slidably mounted upon the drive shaft 10, between the pinions 15 and 17, for rotation with the shaft 10. This clutch may be shifted to engage alternately, a shoulder 21 upon the pinion 15, and a shoulder 22 upon the pinion 17.

A pedal mechanism is provided whereby the clutch 20 may be shifted from opposite ends of the frame 1, one element of this mechanism for shifting the clutch, being shown in detail in Fig. 6. Brackets 23 are mounted upon the cross sill 3, pedals 24 and 25 being pivotally mounted in these brackets. By referring to Fig. 6 of the drawings, it will be seen that these pedals consist of an upright arm 26 and a rectangularly disposed arm 27 whereby the pedal is directly connected with the bracket 23. The portion 27 of the pedal terminates in a foot-plate 28, and the portion 26 of the pedal terminates in an upright finger 29. One end of a spring 30 is secured to the sill 3, the other end of the spring bearing upwardly against the portion 27 of the pedal. In the portion 26 of the pedal, there are spaced openings 31 and 32.

The clutch lever 33, seen most clearly in Fig. 3, is pivotally mounted at spaced points, upon the fingers 29 of the pedals 25 and 24, the end of the clutch lever 33 being so constructed that the clutch 20 may rotate freely therein, the clutch lever being arranged, however, to shift the clutch 20 longitudinally of the shaft 10 upon which it is mounted.

At the opposite end of the frame 1, pedals 34 and 35 are suspended from the end of the frame 1. These pedals 34 and 35 are disposed in brackets 80, the retaining elements being extended through the openings 31. A rod 36 connects the pedal 34 with the pedal 24, and a rod 37 connects the pedal 35 with the pedal 25, the rod 36 being connected with the pedal 34 at the opening 32 therein, and said rod is connected with the pedal 24 at the opening 31 therein; the rod 37 being similarly connected with the pedals 35 and 25. Owing to the fact that the pedal 24 is pivoted intermediate its ends, while the pedal 34 is pivoted at its upper end, a pressure upon either of the pedals 24 or 34 will operate to advance the rod 36 in the same direction; and the same observation is true with respect to the pedals 35 and 25 and the rod 37 whereby they are connected.

A beveled pinion 38 is secured to the shaft 10 adjacent the cross sill 4, this beveled pinion being in mesh with a beveled pinion 39 secured to the end of the shaft 40, disposed substantially at right angles to the drive shaft 10, and journaled for rotation in a bearing 41 on the exterior of the frame 1, and in a bearing 42 which is carried at the end of an arm 81, projecting from the bearing 9.

The end of the shaft 40 protrudes beyond the frame 1, and upon the protruding portion of the shaft there is secured a sprocket wheel 43. To the frame 1 upon either side of this sprocket 43, are secured spaced, upright arms 44, connected at their upper ends by a plate 45, in which is journaled a stub shaft 46, carrying, at its outer end, a sprocket wheel 47, the sprocket wheel 47 being connected with the sprocket wheel 43 by means of a suitable chain 48.

Secured to the top of the housing, adjacent one end thereof, is a tub 50, provided with a lid 51, secured to the tub by means of a hinge 52, and retained upon the tub by means of a catch 53, the lid of the tub opening longitudinally of the frame 1. Upon the top of the lid 51 are disposed cleats 54, transversely of the frame 1, these cleats 54 being united by a brace 55. A bearing 56 disposed substantially parallel to the brace 55, is secured to the lid 51, and in the brace 55 and the bearing 56, is journaled for rotation, a shaft 57, having at its outer end, a pinion 58, adapted to mesh with the pinion 49, upon the stub shaft 46 when the lid 51 is in closed position. Upon the inner end of the shaft 57 there is a beveled pinion 59, in mesh with a beveled pinion 60, secured to the upper end of the shaft 61, journaled in upright position for rotation within the tub 50, the agitating mechanism within the tub 50 being carried by the lower end of the shaft 61, it being understood that this agitating mechanism may be of any desired construction.

Referring to Fig. 3, it will be seen that a shouldered sleeve 62 is secured to the auxiliary shaft 14 in the vicinity of the transverse sill 4, a similarly constructed shouldered sleeve 63 being secured to the shaft adjacent the corner post 2 upon which the bearing 12 is mounted. A sleeve 64 is mounted upon the auxiliary shaft 14 between the elements 62 and 63, the shaft 14 being normally free to rotate within the sleeve 64. The sleeve 64 carries a sprocket wheel 65, so that the sleeve is adapted to serve as a loose pulley upon the shaft 14. The sleeve 64 is terminally provided with outstanding lugs 79, adapted to interlock with the shouldered sleeves 62 and 63 when the sleeve 64 is slid from one end of the auxiliary shaft 14 to the other.

The rack or supplemental frame for the support of the wringer consists of a pair of uprights 66, disposed adjacent one edge of the top 5 of the housing, these uprights being connected at their upper ends by a slat 67. The lower ends of the uprights 66 are connected by a bearing strip 68, adapted to slide along the top 5 adjacent the edge thereof. By means of straps 69, the bearing strip 68 is connected with the guide strip 70, which slides along the lower edge of that portion of the top 5 which outstands beyond the rectangular frame 1. Inner uprights 71 are connected by a bearing strip 72, adapted to slide along the top of the member 5. By means of straps 73, the uprights 71 are connected with a guide strip 74, adapted to slide along the lower face of the top 5, the strap 73 moving in the slot 6 in the top 5. The uprights 66 are connected by means of a brace 75, and the uprights 71 are similarly connected. Upon these braces 75 rests a platform 76, which outstands beyond the contour of the frame 1.

To the slat 67, the wringer 77 may be secured, the wringer being operatively connected with the sprocket 65 upon the sleeve 64, by means of a suitable chain 78.

The operation of the device is as follows:—When the drive shaft 10 is put into rotation the beveled gears 38 and 39 will cause a rotation of the shaft 40, the shaft 40 carrying with it the sprocket wheel 43, which, through the medium of the chain 48 and the sprocket wheel 47, will cause a rotation of the stub shaft 46, the pinion 49 upon the stub shaft, meshing with the pinion 58, causing a rotation of the shaft 57, the shaft 57 operating, through the beveled pinions 59 and 60, to rotate the upright shaft 61, upon which the agitating mechanism within the tub 50 is located. In order to throw the washing machine out of gear, the catch 53 is loosened, and the lid 51 raised, pivoting upon the hinge 52. When the lid is thus raised, the pinion 58 will be lifted out of mesh with the pinion 49.

Let it be supposed, as shown in Fig. 3, that the sleeve 64 is interlocked with the shouldered sleeve 63. Under such conditions, the wringer rack will be disposed, as shown in Fig. 1, adjacent one end of the frame 1, and at a point remote from the tub 50.

While the washing machine is being operated as hereinbefore described, the springs 30 will normally hold the several pedals 34, 35, 24 and 25 in such positions that the clutch 20 will remain, as shown in Fig. 3 midway between the pinions 15 and 17, the drive shaft 10 rotating, without actuating the auxiliary shaft 14. By pressing upon the pedal 24 or the pedal 34, the clutch lever 33, pivoting upon the finger 29 of the pedal 25 will move the clutch 20 to interlock with the shouldered sleeve 22 of the pinion 17. The pinion 17 thus being put into rotation, will, through the medium of the pinion 18, cause a rotation of the pinion 19, and consequently a rotation of the shaft 14, the rotation of the shaft 14 causing a rotation of the sleeve 64, the sprocket 65 of which will engage the chain 78, operating the wringer 77 in one direction. If, however, either of the pedals 25 or 35 be pressed, the lever 33 pivoting upon the finger 29 on the pedal 24 will move the clutch 20 to engage the shouldered sleeve 21, causing a rotation of the pinion 15, which, through the medium of the pinion 16, will cause a rotation of the auxiliary shaft 14, in an opposite direction of that hereinbefore mentioned. Thus, by operating alternately, the pedals 24 and 25 at one end of the device, or the pedals 34 and 35 at the other end thereof, the direction in which the wringer 77 is operated, may be reversed.

When desired, the wringer-supporting rack composed of the uprights 66 and their adjacent elements, may be slid longitudinally of the frame 1, from a point remote from the tub 50 to a point adjacent thereto, the wringer-supporting rack being alined transversely of the frame 1, with the tub 50, the sleeve 64, in such case interlocking with the shouldered sleeve 62. Obviously, when the wringer and its supporting mechanism are disposed adjacent the tub 50, the direction of rotation of the wringer rolls may be reversed by means of the pedals 24 and 25, or 34 and 35, as hereinbefore pointed out.

When the wringer-supporting rack is disposed at a point remote from the tub 50, the elements 79 and 63 being in engagement, the wringer 77 may be operated to wring clothes out of a rinsing tub disposed upon the top 5, the platform 76 serving to support any suitable receptacle for the reception of the clothes which have been previously washed in the tub 50 and placed in a rinsing tub. Or, if desired, the wringer-supporting rack may as hereinbefore described, be slid to a point adjacent the tub 50, the wringer 77 in such case being operative to wring the garments directly from the tub 50.

Owing to the coöperation between the several pedals 24, 25, 34 and 35 and several springs 30, the clutch 20 will normally be maintained at a point midway between the shouldered sleeves 22 and 21. Thus, the wringer-operating mechanism is out of engagement with the drive shaft 10, except when one of the said pedals is pressed. The washing machine as hereinbefore pointed out, is out of engagement with the operating mechanism when the lid 51 of the tub 50 is thrown open.

What I claim is—

1. In a device of the character described, the combination of a frame, an operating mechanism movable to different positions relative to the frame, a power driving element and transmission mechanism adapted to actuate said operating mechanism in its different positions, and a pedal for controlling the operation of said operating mechanism.

2. In a device of the character described, in combination, a frame, an operating mechanism movable to different positions relative to the frame, a driving element, reversing mechanism intermediate of said element, and the operating mechanism for driving said operating mechanism in either direction or rendering it inoperative, and pedals adjacent the operating mechanism in its different positions for controlling the operation of said mechanism.

3. In a device of the class described the combination of a work supporting frame, an operating mechanism movable to different positions relative to said frame, a support uprising from the frame intermediate of the ends thereof for supporting the operating mechanism, a power driven element on the frame, a power transmission member connecting the power driven element and the operating mechanism and means for driving the operating mechanism in a forward or reverse direction as described.

4. A device of the class described comprising a main frame; a shaft journaled for rotation on the said frame; a supplemental frame slidably mounted upon the main frame for movement in a single fixed plane longitudinally of the shaft; operating means upon the supplemental frame; means for operatively connecting said operating means with the shaft at spaced points along the shaft; means for driving the shaft; and means for reversing the rotation of the shaft.

5. A device of the class described comprising a main frame; a shaft journaled for rotation in said frame; a supplemental frame slidably mounted upon the main frame for movement in a single fixed plane longitudinally of the shaft; operating means upon the supplemental frame and spaced from the main frame; means for operatively connecting said operating means with the shaft at spaced points along the shaft; means for driving the shaft; means for reversing the rotation of the shaft; and spaced pedals upon the main frame for the operation of the reversing means, the pedals being yieldingly held in inoperative position.

6. A device of the class described comprising a main frame adapted to serve as a foundation structure for driven mechanism; a drive shaft and an auxiliary shaft, both journaled for rotation in said frame; spaced gear trains inoperatively connecting the drive shaft with the auxiliary shaft; a clutch operating upon the drive shaft between the gear trains and operative to connect the same, alternately, with the drive shaft to reverse the rotation of the auxiliary shaft; and pedals upon the main frame for operating the clutch from opposite ends of the main frame.

7. A device of the class described comprising a main frame; an auxiliary shaft journaled for rotation in said frame; a supplemental frame slidably mounted upon the main frame for movement longitudinally of the auxiliary shaft; a pulley slidably mounted upon the auxiliary shaft; a belt carried by the pulley; mechanism upon the supplemental frame operable by the belt; elements upon the auxiliary shaft to lock the pulley at spaced points for rotation with said shaft; a drive shaft journaled for rotation in the main frame; spaced gear trains inoperatively connecting the drive shaft with the auxiliary shaft; and a clutch operating upon the drive shaft between the gear trains and operative to connect the same, alternately, with the drive shaft to reverse the rotation of the auxiliary shaft.

8. In a machine of the character described, in combination a main frame, an operating shaft, a driving member slidably carried on said shaft and arranged to have a clutch connection with said shaft, driving means slidably mounted on said frame, and a permanent connection between said driving means and said driving member.

9. In a device of the class described, the combination of a work supporting surface, an operating mechanism movable to different positions relative to the work supporting surface, a power driven element, driving mechanism extending upwardly through the work supporting surface for actuating the operating mechanism in its different positions, and reversing mechanism whereby the driving mechanism may be actuated in either direction as desired.

10. In a device of the class described, the combination of a frame, an operating mechanism movable to different positions relative to the frame, a drive shaft, a counter shaft, interengaging rotary members connecting the drive and the counter shaft, driving connections from the counter shaft to the operating mechanism and means controlled by the operator for imparting opposite directions of rotation to the counter shaft.

11. In a device of the class described, in combination, a main supporting frame, an operating mechanism, a support therefor spaced above the frame a sufficient distance to provide clearance therebetween for the placing of receiving receptacles, said support being movable to different positions relative to said main supporting frame, a drive shaft and driving connections between said drive shaft and said operating mechanism for operating the latter in any of its different positions of adjustment, said connections including reversing means so arranged as to drive said operating means in reverse directions.

12. In a device of the class described, a main supporting frame, a mechanism support spaced above the latter to provide clearance for the placing of receiving receptacles therebetween, said mechanism support being movable to different positions relative to said main supporting frame, operating mechanism including a motive force susceptible of operation to drive the operating mechanism alternately in reverse directions in any of its different positions of adjustment.

13. In a machine of the character described, in combination, a main frame, a shaft journaled therein, a counter shaft journaled in said main frame and means for operating said counter shaft from said first mentioned shaft in reverse directions, a supplemental supporting frame mounted on said main frame, said supplemental supporting frame being manually movable relatively to said main frame, a driving mechanism mounted on said supplemental frame, and a chain and sprocket connection between said driving mechanism and said counter shaft movable with said supplemental supporting frame.

14. In a machine of the character described, in combination, a main frame, an operating shaft, clutch members on said shaft, one near each end thereof, a supplemental frame slidable longitudinally of said operating shaft, a driving member movable with said frame and capable of having a clutch connection with either of said clutch members when said supplemental frame is disposed at opposite ends of said shaft, driven mechanism movable with said supplemental frame and adapted to be operated from said operating shaft, and means for reversing the direction of rotation of said operating shaft.

15. In a machine of the character described, in combination, a portable frame, a shaft disposed longitudinally of said frame, a supplemental frame mounted upon said portable frame and adapted to be moved from one end thereof to the other, said supplemental frame comprising spaced uprights or standards, driving mechanism mounted on the upper portion of said movable frame, means movable with said movable frame for operatively connecting said driving mechanism with said shaft, when said movable frame is in various positions on said main frame, and means for reversing the direction of movement of said shaft.

16. In a machine of the character described, in combination, a main frame, a shaft journaled for rotation on said frame, a supplemental frame slidably mounted on said main frame, said supplemental frame comprising spaced uprights or standards and a top piece connected thereto, a driven mechanism on said supplemental frame and movable therewith, connections between said driven mechanism and said shaft, said connections being movable with said supplemental frame and including means for clutching said connections in operative relation to said main shaft when said supplemental frame is in different positions on said main frame, and means for reversing the direction of movement of said shaft.

17. In a machine of the character described, in combination, a frame, a shaft, a driving member slidably carried on said shaft, spaced clutches on said shaft, said driving member adapted to operatively engage either of said spaced clutches, driving means slidably mounted on said frame, a permanent connection between said driving means and said driving member, and means for reversing the direction of movement of said shaft.

18. In a machine of the character described, in combination, a portable frame support, a supplemental frame supported on said frame support, said supplemental frame including spaced uprights or standards, a head piece connected to said uprights or standards, a shaft journaled on said frame support adapted to be driven from a suitable source of power, a counter shaft, means for driving the counter shaft from the first mentioned shaft in reverse directions, a driving mechanism at the head end of said supplemental frame, a driving member at the base of said supplemental frame, a permanent driving connection between said driving mechanism and said driving member, means for intermittently connecting said driving member with said counter shaft at different points thereon, said supplemental frame being so mounted on said frame support from the supplemental frame may be moved to position the driving mechanism on the supplemental frame in different positions relative to said frame support, and the driving connections between the driving mechanism and said driving member being so arranged that the movement of the supplemental frame will not disturb the permanent relation of said driving connection.

19. In a machine of the character described, in combination, a main frame, a shaft journaled therein, means for operating said shaft in reverse directions, a supplemental frame movably mounted on said main frame, including spaced uprights or standards, a top piece connected thereto, a mechanism mounted thereon, a driving member adapted to have a clutch connection with said shaft, and driving connections between said driving member and said mechanism.

20. In a machine of the class described, in combination, a main frame, a shaft journaled therein, a counter shaft journaled in said main frame and means for operating said counter shaft from said first mentioned shaft in reverse directions, a supplemental supporting frame mounted on said main frame, said supplemental supporting frame being manually movable relative to said main frame, a driving mechanism mounted on said supplemental frame and a belt connection between said driving mechanism and said counter shaft movable with said supplemental supporting frame.

21. In a machine of the character described, in combination, a main frame, a shaft journaled in said frame and adapted to be driven from a suitable source of power, means for operating said shaft in reverse directions, a supplemental frame including spaced uprights or standards and a top piece connected thereto, a mechanism mounted on said supplemental frame, a driving member adapted to be operatively connected with said shaft, a permanent connection between said driving member and said mechanism, clutch devices for connecting said driving member to said shaft, said clutch devices and said driving member being movable with said supplemental frame along said main frame.

22. In a machine of the character described, in combination, a main frame, an operating shaft, means for operating said shaft in reverse directions, a driving member slidably carried on said shaft and arranged to have a clutch connection with said shaft, driving means slidably mounted on said frame, and a permanent connection between said driving means and said driving member.

23. In a mechanism of the class described, the combination of a pair of horizontal roller shafts, a frame supporting said roller shafts, and movable to different locations, driving gears for said roller shafts, a power shaft and means connecting the said power shaft and gears for turning the roller shafts in opposite directions.

24. In a machine of the class described, the combination of a support, a frame mounted to move bodily in a horizontal plane, horizontal roller shafts connected to be driven in opposite directions and mounted in the movable frame, a motor, and driving connections between said motor and said roller shafts adapted to drive the latter in reverse directions, and means for interrupting the driving connections.

25. In a machine of the class described, the combination of a suitable support, a frame spaced above said support and movable to different positions relative thereto, operating mechanism in said frame, a motor and driving connections between said motor and said operating means to drive the latter reversely in opposite directions.

26. In a mechanism of the class described, the combination of a suitable support, a frame mounted upon said support and upstanding therefrom, operating mechanism in said support mounted to move with said frame into different positions, a drive shaft and means connecting the drive shaft and the operating means for driving the latter reversely in opposite directions.

27. In a mechanism of the class described, the combination of a driven member, a driving member, means connecting the driving and driven members to instantly reverse the movement of the latter or to allow the same to stop at the will of the operator.

28. In a machine of the class described, a support, a frame upstanding from said support, and adapted to be moved into different operative positions relative to said support, operating mechanism on the movable frame, a driving member, and connecting means between the driving member and the operating mechanism for operating the mechanism in its different operative positions and to reverse the direction of the movement of said operating mechanism in one of its operative positions.

29. In a device of the character described, the combination of a support, a frame spaced above the support and movable relative to the support into different operative positions, operating mechanism in the movable frame, and means for operating the operating mechanism by power in any of the operative positions of adjustment thereof, said means including mechanism for operating said operating mechanism in reverse directions.

30. In a device of the character described, the combination of a support, a supplemental frame thereon, operating mechanism in the supplemental frame, including a pair of wringer rolls, said supplemental frame being movable to different operative positions of adjustment, and means for operating the operating mechanism by power in any of the operative positions of adjustment thereof, said means including mechanism for operating said operating mechanism in reverse directions.

31. An apparatus of the class described including in combination, a supporting means, two independently operable mechanisms mounted on said supporting means, one of said mechanisms being movable relatively to the other, a power driven means also carried by said supporting means, a single connecting mechanism between the power driven means and the fixed operable mechanism to drive said mechanism in one direction, normally inactive duplex driving connections between the power driven means and the movable operable mechanism, and reversing means for optionally engaging one of said duplex driving connections with said power driven means to operate said movable mechanism in either of two directions.

32. An apparatus of the class described including in combination, a supporting means, an operable mechanism movable on said supporting means, a power driven means also carried by said supporting means, normally inactive duplex driving connections between said power driven means and said operable mechanism, and reversing means for optionally engaging one of said duplex connections with said power driven means to operate said movable mechanism in either of two directions.

33. An apparatus of the class described including in combination, a supporting means, two independently operable mechanisms mounted on said supporting means, one of said mechanisms being movable in a straight line relatively to the other, a power driven shaft on said supporting means, a single continuously operating connecting mechanism between the power shaft and the fixed operable mechanism to drive said mechanism in one direction, normally inactive duplex driving connections between the power shaft and the movable operable mechanism, means for coupling said duplex driving connections with the movable operable mechanism at determined positions only, and reversing means for optionally engaging one of said duplex connections with the driving shaft to operate said movable mechanism in either of two directions.

34. In a device of the class described, in combination, a frame, a driving shaft, means for operating said shaft, a support movable relatively to said frame, a reversible actuating means loosely mounted on said shaft, means for alternately clutching said gears to said shaft, and a mechanism on said movable support adapted to be operated from said shaft.

35. In a device of the class described, a suitable support, an operating means mounted on said support and adapted to be moved to different positions relative to said support, means to lock the operating mechanism in different positions on said support, a drive shaft, connections including a clutch between the said shaft and said operating means for driving the latter, including means for reversing the movement thereof.

36. In a device of the class described, a suitable support, a driving shaft disposed horizontally on the support, a frame member on said support movable to different positions relative thereto, operating mechanism in said frame member, driving connections between said drive shaft and the said operating mechanism, and means for operating said drive shaft in opposite directions.

37. In an apparatus of the character described, a main frame, a driving shaft journaled on said frame and adapted to be driven from a suitable source of power, a mechanism arranged in an elevated position above said frame, and adapted to be moved to different positions relative to said main frame, connections between the driving shaft and said mechanism including means for reversely operating said mechanism.

38. In a machine of the character described, a main frame, a supplemental frame adapted to be moved to different positions relative to said main frame, an operating means mounted in said supplemental frame, a power driven element and connections between said power driven element and said operating means to actuate said operating means, as desired, in different positions relative to said main frame, said connections including reversing means for actuating the operating means in either direction, as desired.

39. In a machine of the character described, a main frame, a supplemental frame movably mounted thereon and adapted to be moved to different positions relative to said main frame, an operating means mounted on said supplemental frame, actuating means for said operating means including a power driven element, said power driven element being adapted to be thrown into and out of operative relation with parts of said actuating means for driving said operating means in either direction as desired.

40. In a device of the character described, in combination, a frame, an operating mechanism movable to different positions relative to the frame, gear connection for driving said operating mechanism including a shaft and reversing mechanism for driving said operating mechanism in reverse direction, and means for controlling the operation of said reversing mechanism including a foot pedal held normally to establish an inoperative relation of said gear with said operating mechanism but operable under pressure to cause said reversing mechanism to establish operative connections between said gear and said operating mechanism to drive said operating mechanism in either forward or reverse direction.

41. In a device of the class described, in combination, a frame, a supporting member thereon, movable to different positions relative to said frame, an operating mechanism mounted on said support, a driving member, means connecting the driving member with said operative mechanism, means including double acting clutch members for reversing movement of said driving shaft, and members spaced apart and connected respectively with said clutch members, operable by manual force, and in alternating order to effect engagement with said clutch members, whereby the operator, standing adjacent to the operating mechanism in its different positions of adjustment, may conveniently operate the clutch mechanism to effect the desired direction of movement of the operating mechanism.

42. In a device of the class described, in combination, a frame, a support thereon, movable to different positions relative to said frame, an operating mechanism mounted on said support and capable of reverse action, a drive shaft, and connections from said drive shaft to the operating mechanism, including clutch members, operative to effect reverse movement of said operating mechanism, a shiftable member alternately engageable with said clutch members and positioned relative thereto that said member may be out of engagement with said clutch members, or may be in engagement with either, at the will of the operator, and foot pedals connected respectively with said shiftable member in a manner to maintain said shiftable member normally out of engagement with said clutch members, but operable one to cause engagement with one of said clutch members, and the other to effect engagement with the other of said clutch members.

43. In a device of the class described, in combination, a frame, a supporting member mounted on said frame, and movable relative thereto, an operating mechanism on said support, a driving member, members between the drive shaft and the operating mechanism for driving the latter from the former, normally disconnected, means for effecting a connection between said members to actuate said operating mechanism alternately in reverse directions at will, including means operable by force applied to establish said driving connection and automatically operable, when such force is removed to effect a disengagement of said driving connection.

44. In a device of the class described, in combination, a main supporting frame, a container element supported thereon, an operating mechanism movable to different positions relative to said container, a driven member, means connecting the driven member and the operating mechanism in a relation that the latter shall be driven from the former in its different positions of adjustment, and means under the control of the operator, associated with said driving connection between the driven member and the operating mechanism, to operate the operating mechanism in reverse directions and to disconnect to render the operating mechanism inoperative when desired.

45. In a device of the class described, in combination, a main supporting frame, a container element supported thereon, an operating mechanism movable to different positions relative to said container, a driven member, means connecting the driven member and the operating mechanism in a relation that the latter shall be driven from the former in its different positions of adjustment, and means, including a pedal, under the control of the operator, associated with said driving connection between the driven member and the operating mechanism, to operate the operating mechanism in reverse directions and to disconnect to render the operating mechanism inoperative when desired.

In testimony that I claim the foregoing as my own, I have hereto affixed my signature in the presence of two witnesses.

JOHN ROCKE.

Witnesses:
JOHN L. ENGEL,
WM. ROCKE.